(12) United States Patent
Azadet et al.

(10) Patent No.: US 9,170,776 B2
(45) Date of Patent: Oct. 27, 2015

(54) DIGITAL SIGNAL PROCESSOR HAVING INSTRUCTION SET WITH A LOGARITHM FUNCTION USING REDUCED LOOK-UP TABLE

(75) Inventors: Kameran Azadet, Morganville, NJ (US); Jian-Guo Chen, Basking Ridge, NJ (US); Samer Hijazi, Bethlehem, PA (US); Joseph Williams, Holmdel, NJ (US)

(73) Assignee: Intel Corporation, Santa Clara, CA (US)

( * ) Notice: Subject to any disclaimer, the term of this patent is extended or adjusted under 35 U.S.C. 154(b) by 1225 days.

(21) Appl. No.: 12/362,899

(22) Filed: Jan. 30, 2009

(65) Prior Publication Data

US 2010/0198895 A1 Aug. 5, 2010

(51) Int. Cl.
*G06F 1/035* (2006.01)
*G06F 7/556* (2006.01)
*G06F 1/03* (2006.01)

(52) U.S. Cl.
CPC .............. *G06F 7/556* (2013.01); *G06F 1/035* (2013.01); *G06F 1/0307* (2013.01); *G06F 2101/10* (2013.01)

(58) Field of Classification Search
CPC combination set(s) only.
See application file for complete search history.

(56) References Cited

U.S. PATENT DOCUMENTS

| | | | |
|---|---|---|---|
| 6,529,922 B1 * | 3/2003 | Hoge | 708/204 |
| 6,844,880 B1 | 1/2005 | Lindholm et al. | |
| 7,657,589 B2 * | 2/2010 | Verma | 708/605 |
| 2003/0220953 A1 * | 11/2003 | Allred | 708/277 |
| 2004/0010532 A1 * | 1/2004 | Lu | 708/512 |
| 2007/0061389 A1 * | 3/2007 | Hussain | 708/277 |
| 2007/0112902 A1 | 5/2007 | Dance et al. | |

* cited by examiner

*Primary Examiner* — Ilwoo Park
(74) *Attorney, Agent, or Firm* — Nicholson De Vos; Webster & Elliot LLP

(57) ABSTRACT

A digital signal processor is provided having an instruction set with a logarithm function that uses a reduced look-up table. The disclosed digital signal processor evaluates a logarithm function for an input value, x, by decomposing the input value, x, to a first part, N, a second part, q, and a remaining part, r, wherein the first part, N, is identified by a position of a most significant bit of the input value, x, and the second part, q, is comprised of a number of bits following the most significant bit, wherein the number is small relative to a number of bits in the input value, x; obtaining a value $$\mathrm{Log}_2\!\left(1 + \tfrac{1}{2}q\right)$$

from a first look-up table based on the second part, q; computing an epsilon term, $\epsilon$, using the expression $$\frac{2^{-N}}{1 + \tfrac{1}{2}q}\,r;$$

evaluating an expression $\mathrm{Log}_2(1+\epsilon)$ using a polynomial approximation, such as a cubic approximation; and determining the logarithm function for the input value, x, by summing the values of N, $$\mathrm{Log}_2\!\left(1 + \tfrac{1}{2}q\right)$$

and $\mathrm{Log}_2(1+\epsilon)$.

20 Claims, 3 Drawing Sheets

DIGITAL SIGNAL PROCESSOR HAVING INSTRUCTION SET WITH A LOGARITHM FUNCTION USING REDUCED LOOK-UP TABLE

CROSS-REFERENCE TO RELATED APPLICATIONS

The present application is related to U.S. patent application Ser. No. 12/324,926, entitled "Digital Signal Processor Having Instruction Set with One or More Non-Linear Complex Functions;" U.S. patent application Ser. No. 12/324,927, entitled "Digital Signal Processor Having Instruction Set With One Or More Non-Linear Functions Using Reduced Look-Up Table;" U.S. patent application Ser. No. 12/324,931, entitled "Digital Signal Processor Having Instruction Set with One or More Non-Linear Functions Using Reduced Look-Up Table with Exponentially Varying Step-Size;" and U.S. patent application Ser. No. 12/324,934, entitled "Digital Signal Processor with One or More Non-Linear Functions Using Factorized Polynomial Interpolation;" each filed Nov. 28, 2008 and incorporated by reference herein.

FIELD OF THE INVENTION

The present invention is related to digital signal processing techniques and, more particularly, to techniques for digital processing of non-linear functions.

BACKGROUND OF THE INVENTION

Digital signal processors (DSPs) are special-purpose processors utilized for digital processing. Signals are often converted from analog form to digital form, manipulated digitally, and then converted back to analog form for further processing. Digital signal processing algorithms typically require a large number of mathematical operations to be performed quickly and efficiently on a set of data.

DSPs thus often incorporate specialized hardware to perform software operations that are often required for math-intensive processing applications, such as addition, multiplication, multiply-accumulate (MAC), and shift-accumulate. A Multiply-Accumulate architecture, for example, recognizes that many common data processing operations involve multiplying two numbers together, adding the resulting value to another value and then accumulating the result. Such basic operations can be efficiently carried out utilizing specialized high-speed multipliers and accumulators.

DSPs, however, generally do not provide specialized instructions to support non-linear mathematical functions, such as exp, log, cos, 1/x and $x^K$. Increasingly, however, there is a need for non-linear arithmetic operations in processors. A nonlinear function is any problem where the variable(s) to be solved for cannot be written as a linear sum of independent components. If supported at all, a DSP supports a non-linear function by using a large look-up table (LUT). An exemplary LUT may store on the order of 2,000 16 bit values, and thus require 32 kilobits of random access memory (RAM). The LUT is typically implemented in a separate dedicated SRAM (so that data and the non-linear LUT can be accessed at the same time to achieve improved performance).

In cases where the DSP is based on VLIW (Very Long Instruction Word) or SIMD (Single Instruction Multiple Data) architectures with N issues slots, the memory size becomes even larger. The LUT must be replicated N times because each issue slot must be able to read different values in the look-up table simultaneously, as the values of the data in each issue slot may be different. This replication of memory results in an even greater silicon area. For example, assuming a LUT in a 4-way vector co-processor, a memory size of 128 Kb is required (32 Kb×4). In addition, if different non-linear functions are required for different parts of a program being executed, the various LUTs must be loaded into memory, thereby significantly increasing latency and potentially reducing performance.

A need therefore exists for a digital signal processor having an instruction set that supports a logarithm function using a look-up table of reduced size.

SUMMARY OF THE INVENTION

Generally, a digital signal processor is provided having an instruction set with a logarithm function that uses a reduced look-up table. According to one aspect of the invention, the disclosed digital signal processor evaluates a logarithm function for an input value, x, by decomposing the input value, x, to a first part, N, a second part, q, and a remaining part, r, wherein the first part, N, is identified by a position of a most significant bit of the input value, x, and the second part, q, is comprised of a number of bits following the most significant bit, wherein the number is small relative to a number of bits in the input value, x; obtaining a value $$\text{Log}_2\left(1 + \frac{1}{2}q\right)$$

from a first look-up table based on the second part, q; computing an epsilon term, $\epsilon$, using the expression $$\frac{2^{-N}}{1 + \frac{1}{2}q} r;$$

evaluating an expression $\text{Log}_2(1+\epsilon)$ using a polynomial approximation, such as a cubic approximation; and determining the logarithm function for the input value, x, by summing the values of N, $$\text{Log}_Z\left(1 + \frac{1}{2}q\right)$$

and $\text{Log}_2(1+\epsilon)$.

An initial basis of the logarithm function can optionally be translated from a binary representation to an arbitrary basis, Y, by multiplying a result of the determining step by $\text{Log}_Y(2)$, where $\log_Y(2)$, is obtained from a look-up table. The value $$\left(1 + \frac{1}{2}q\right)^{-1}$$

can be obtained from a second look-up table. The step of computing the epsilon term, $\epsilon$, can comprise the steps of shifting r by N and multiplying by $$\left(1 + \frac{1}{2}q\right)^{-1}.$$

Generally, entries in the look-up table have a fewer number of bits than a number of bits in the input value, x. If the input value, x, is not a binary number and has an initial basis, Z, then the disclosed method replaced the number two in a number of equations with a Z.

A more complete understanding of the present invention, as well as further features and advantages of the present invention, will be obtained by reference to the following detailed description and drawings.

DETAILED DESCRIPTION

The present invention provides a digital signal processor that supports a logarithm function using one or more look-up tables of reduced size. Generally, one or more look-up tables store a subset of values for at least a portion of the computation of a logarithm function. The present invention recognizes that a Taylor series approximation can be employed to compute a logarithm function when the dynamic range of the input value is limited, as discussed further below. As used herein, the term "digital signal processor" shall be a processor that executes instructions in program code. Further, a hardwired logic implementation of digital signal processing functions is not considered herein. While the present invention is illustrated for computing logarithm functions of various exemplary bases (e.g., bases of 2, 10 and e for computing exemplary logarithm functions $\log_2(x)$, $\log_{10}(x)$ and $\log(x)$, respectively), the present invention can be applied to any basis value, as would be apparent to a person of ordinary skill in the art. It is further noted that the disclosed logarithm function can be applied for values of x that are scalar or vector inputs.

In this manner, the present invention supports logarithm functions by using a smaller look-up table than required by conventional techniques. As previously indicated, an exemplary look-up table may store on the order of 2,000 16 bit values, and thus require 32 kilobits of random access memory (RAM). With the present invention, a smaller look-up table can be employed to store a subset of the 2,000 values.

Figure 1:
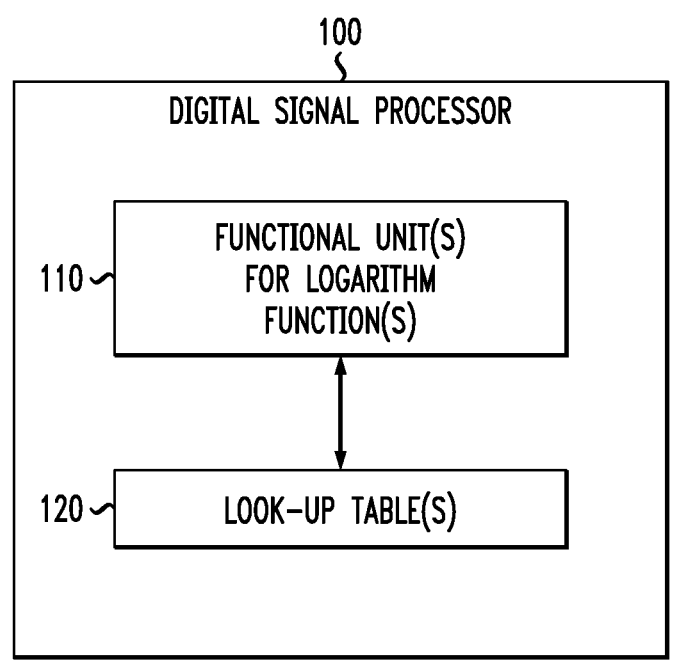
FIG. 1 is a schematic block diagram of an exemplary digital signal processor that incorporates features of the present invention.

FIG. 1 is a schematic block diagram of an exemplary digital signal processor 100 that incorporates features of the present invention. As shown in FIG. 1, the exemplary digital signal processor 100 includes one or more functional units 110 for logarithm functions. In addition, the digital signal processor 100 comprises one or more look-up tables 120 that store a subset of values for computing the logarithm function.

As discussed hereinafter, in various embodiments, the digital signal processor 100 may use hardware or a look-up table (or a combination thereof) to compute the logarithm function. Generally, if the digital signal processor 100 is processing software code that includes a predefined instruction keyword corresponding to a logarithm function and any appropriate operands for the function, the instruction decoder must trigger the appropriate logarithm functional units 110 that is required to process the instruction. It is noted that a logarithm functional unit 110 can be shared by more than one instruction.

Generally, the present invention extends conventional digital signal processors to provide an enhanced instruction set that supports logarithm functions using one or more look-up tables. The digital signal processor 100 in accordance with the present invention receives at least one number as an input, applies a logarithm function to the input and generates an output value.

The disclosed digital signal processors may have a scalar architecture, as shown in FIG. 1, that processes a single number at a time, or a vector architecture, as discussed hereinafter in conjunction with FIG. 3, that processes one or more numbers simultaneously. In the case of a vector-based digital signal processor implementation, the input number is a vector comprised of a plurality of scalar numbers that are processed in parallel.

Polynomial Approximation of Logarithm Functions

The present invention recognizes that a logarithm function can be approximated using a Taylor series. Thus, a logarithm function, log(x), can be expressed as:

$$\text{Log}(1 + x) = x - \frac{x^2}{2} + \frac{x^3}{3} - \frac{x^4}{4} + \ldots \quad (1)$$

In addition, the present invention recognizes that a cubic approximation (i.e., including up to $x^3$ in the Taylor series) is suitable for values of x such that $0 < x < x_0$, where $x_0$ is a sufficiently small value for a desired accuracy of the value of log(x). For example, for a desired error bound of $10^{-5}$, it can be shown that $x_0$ may have a value of $\frac{1}{16}$. It is noted that the exemplary Taylor series is centered around one for the logarithm function, as the logarithm function approaches negative infinity at zero (which should be avoided) and is well-behaved at one. As discussed hereinafter, the present invention employs a scaling technique to reduce the input values for the logarithm function to a small range, and then applies the Taylor series approximation within the smaller range.

It is noted that $\log_2(x)$ can be expressed as a function of log(x), using the following identity:

$$\text{Log}_2(x) = \text{Log}_2(e^{\text{Log}(x)}) = \text{Log}(x) \cdot \text{Log}_2(e) \quad (2)$$

Similarly, $\log_2(1+x)$ can be expressed as follows:

$$\text{Log}_2(1+x) = \text{Log}(1+x) \cdot \text{Log}_2(e) \quad (3)$$

for $0 \leq x \leq x_0$.

As indicated above, the present invention employs a scaling technique to reduce the input values for the logarithm function to a small range, and then applies the Taylor series approximation within the smaller range. Thus, the input value, x, can be decomposed as binary number having the most significant bit in bit position, N, as follows:

$$x = 2^N + a_{N-1} 2^{N-1} + a_{N-2} 2^{N-2} + a_{N-3} 2^{N-3} + r \quad (4)$$

Thus, N is an index indicating the position of the most significant bit having a binary value of one. It is noted that terms two through four on the right hand side of equation (4) (the next few bits following the MSB) can be simplified to:

$$q \cdot 2^{N-1}$$

where:

$$q = a_{N-1} + a_{N-2} 2^{-1} + a_{N-3} 2^{-2}$$

Thus, x can be alternately written as follows:

$$x = 2^N + q2^{N-1} + r \quad (5)$$

Therefore, $$\log_2(x) = \log_2\left(2^N\left(1 + q\frac{1}{2} + r2^{-N}\right)\right) \quad (6)$$

$$\log_2(x) = \log_2(2^N) + \log_2\left(1 + q\frac{1}{2} + r2^{-N}\right) \quad (7)$$

$$\mathrm{Log}_2(x) = N + \mathrm{Log}_2\left(1 + \frac{1}{2}q + 2^{-N}r\right) \quad (8)$$

$$\mathrm{Log}_2(x) = N + \mathrm{Log}_2\left(1 + \frac{1}{2}q\right) + \mathrm{Log}_2\left(1 + \frac{2^{-N}}{1+\frac{1}{2}q}r\right) \quad (9)$$

where the final term, $$\frac{2^{-N}}{1+\frac{1}{2}q}r,$$

is a small value, referred to as $\epsilon$. Since $\epsilon$ is small, the 1+x Taylor series approximation for logarithms of equation (1) can be employed.

The present invention recognizes that the three terms of equation (9) can either be easily computed in hardware or accessed from a small look-up table. As used herein, a "small" look-up table shall indicate that the number of bits of each entry in the look-up table is significantly smaller than the number of bits in the input value, x. In particular, N is obtained by determining the index of the MSB of the input value, x. The second term, $$\mathrm{Log}_2\left(1 + \frac{1}{2}q\right),$$

is a logarithm of a number based on q, where q is represented with a small number of bits, such as 3 or 4 bits, that follow the most significant non-zero bit (e.g., the first binary one in the input value, x, starting from the left in a conventional binary representation of the input value). Thus, the second term can easily be obtained from a small look-up table. Since $\epsilon$ is small, the third term can be computed using the (1+x) Taylor series approximation for logarithms of equation (1).

The present invention recognizes that the logarithm computation of equation (9) can be generalized to any basis other than two. Typically, other valuable basis values comprise e and 10. Thus, for many applications, the present invention can compute a logarithm function for bases of 2, 10 and e (e.g., for computing exemplary logarithm functions $\mathrm{Log}_Y(x)$).

To compute $\mathrm{Log}_Y(x)$, the following identity is employed:

$$\mathrm{Log}_Y(x) = \mathrm{Log}_Y(2^{\mathrm{Log}_2(x)}) = \mathrm{Log}_2(x) \cdot \mathrm{Log}_Y(2) \quad (10)$$

where $\mathrm{Log}_2(x)$ is computed using equation (9) and $\mathrm{Log}_Y(2)$ can be obtained from a small look-up table, typically requiring only a few values of Y (2, 10, e), as discussed further below in conjunction with FIG. 2.

Figure 2:
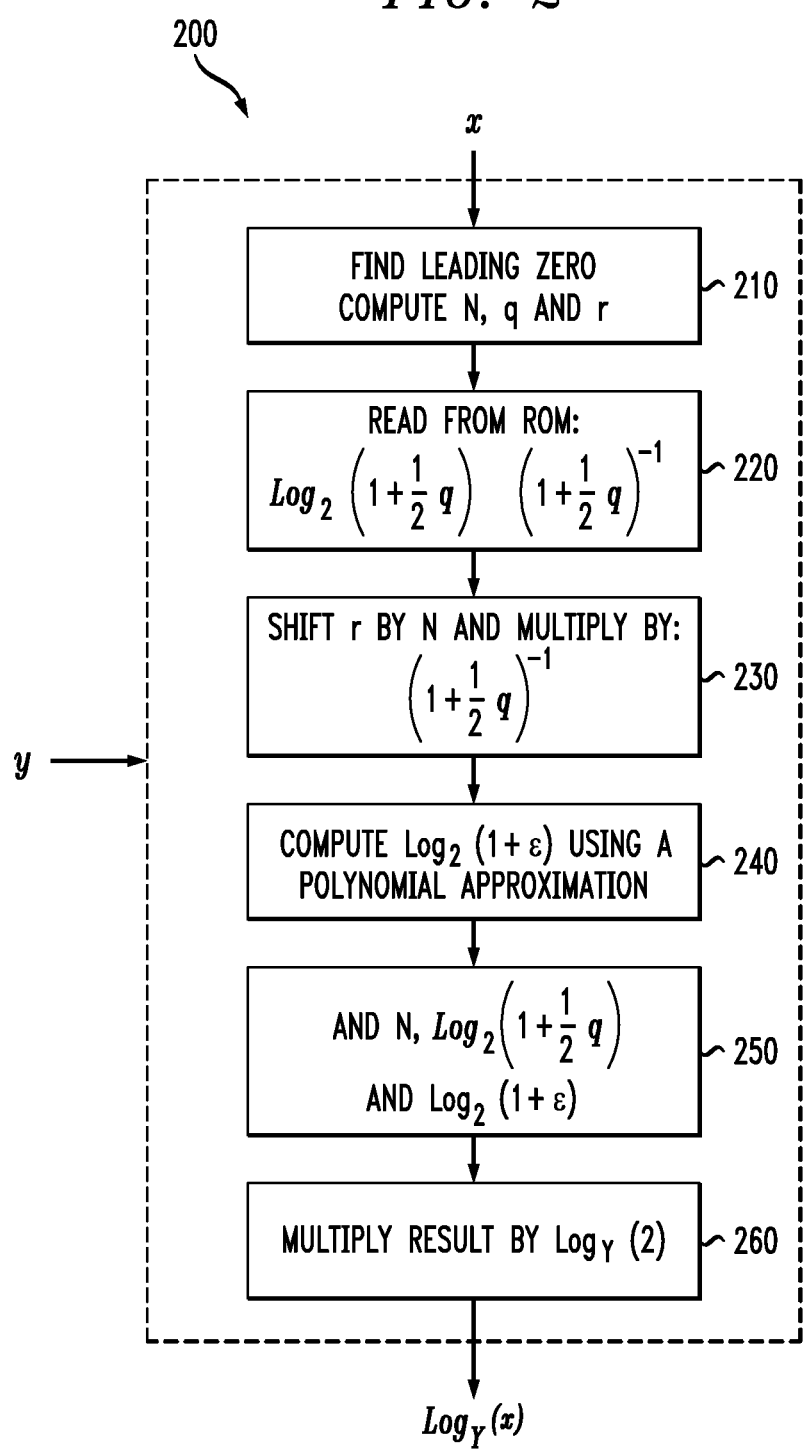
FIG. 2 is a flow chart describing an exemplary implementation of a logarithm function computation process that incorporates features of the present invention.

FIG. 2 is a flow chart describing an exemplary implementation of a logarithm function computation process 200 that incorporates features of the present invention. As shown in FIG. 2, the logarithm function computation process 200 initially finds the leading zero during step 210 in the input value, x, and then computes the values of N, q and r, as discussed above in conjunction with equation (4).

Thereafter, during step 220, the logarithm function computation process 200 reads the values of $$\mathrm{Log}_2\left(1 + \frac{1}{2}q\right)$$

and $$\left(1 + \frac{1}{2}q\right)^{-1},$$

for example, from a look-up table in ROM.

During step 230, the logarithm function computation process 200 computes $\epsilon$ by shifting r by N (to get $2^{-N}r$, the numerator of the $\epsilon$ value) and then multiplying by $$\left(1 + \frac{1}{2}q\right)^{-1}$$

(the denominator of the $\epsilon$ value).

Thereafter, the logarithm function computation process 200 computes the third term of equation (9), $\mathrm{Log}_2(1+\epsilon)$, using the polynomial approximation of equation (1).

The result of equation (9) is obtained during step 250 by adding the three terms: N, $$\mathrm{Log}_2\left(1 + \frac{1}{2}q\right)$$

and $\mathrm{Log}_2(1+\epsilon)$.

Finally, the initial of 2 is optionally translated to an arbitrary basis, Y, during step 260 by multiplying the result of step 250 by $\mathrm{Log}_Y(2)$. It is noted that the exemplary implementation of the logarithm function computation process 200 assumes that the input value, x, has an initial basis of two (i.e., is a binary representation). The logarithm function computation process 200 could be implemented, however, for an input value having any initial basis, Z, by employing $\log_{Z(\ )}$ instead of $\log_{2(\ )}$ during steps 220, 240 and 260, as would be apparent to a person of ordinary skill in the art. Generally, in equations (5) and (6), the number two (2) is replaced by Z.

Figure 3:
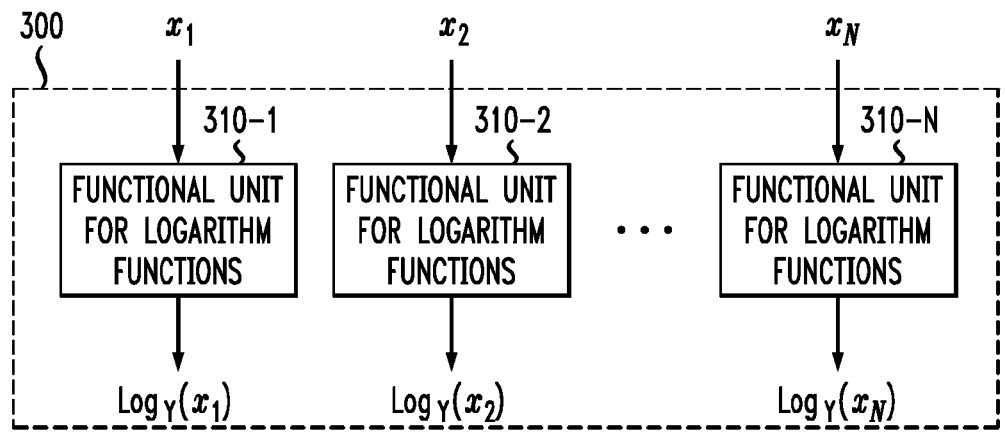
FIG. 3 is a schematic block diagram of an exemplary vector-based digital signal processor that processes one or more numbers simultaneously in accordance with an embodiment of the present invention.

FIG. 3 is a schematic block diagram of an exemplary vector-based digital signal processor 300 that processes one or more numbers simultaneously in accordance with an embodiment of the present invention. Generally, the vector-based implementation of FIG. 3 increases the number of MIPS (instructions per second), relative to the scalar implementation of FIG. 1, by performing different processes concurrently. Thus, the vector-based digital signal processor 300 contains plural functional units for logarithm functions 310-1 through 310-N. For example, a dual digital signal processor 300 contains two functional units 310-1 and 310-2 that are capable of performing two independent non-linear function operations concurrently.

As noted above, the input to the vector-based digital signal processor 300 is a vector, X, comprised of a plurality of scalar numbers, $x_n$, that are processed in parallel. For example, assume a vector-based digital signal processor 300 supports a logarithm function for a vector, X, where X is comprised of scalar numbers $x_1$ through $x_4$. The exemplary logarithm function may be expressed as follows:

$$\text{Log\_vec4}(x_1, x_2, x_3, x_4, \text{type}),$$

where type typically equals "2," "10" or "e."

Figure 4:
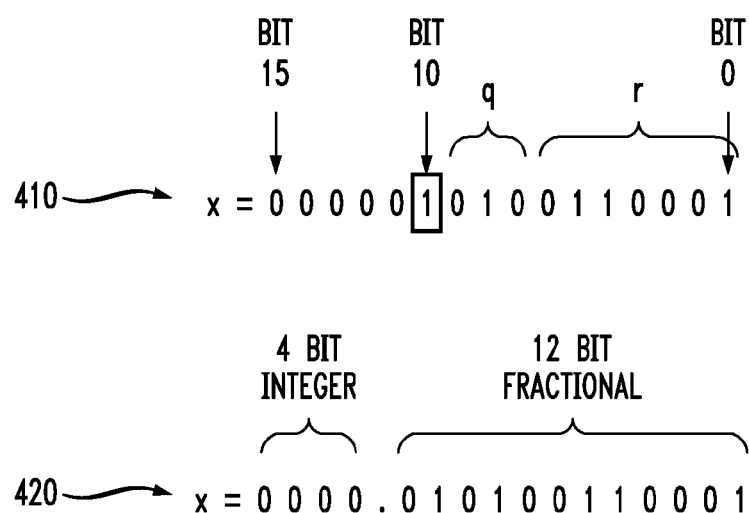
FIG. 4 illustrates two exemplary input values, x, for a logarithm function in accordance with the present invention.

FIG. 4 illustrates two exemplary input values, x, 410 and 420. Input values 410 and 420 are binary representations of x. As shown in FIG. 4, the first input value 410 is equal to:

$$2^{10} + 2^8 + 2^5 + 2^4 + 2^0,$$

or 1329 in a decimal representation. As indicated above, N is obtained by determining the index of the MSB of the input value, x; q is represented with a small number of bits, such as 3 or 4 bits, that follow the most significant non-zero bit, and r is the remaining bits. Thus, for the first input value 410, N equals 10, q equals 010 and r equals 0110001. When equation (9) is evaluated using these values, the result ($\log_2(x)$) can be shown to be 10.37612614.

As shown in FIG. 4, the second exemplary input value 420 is equal to:

$$1329 * 2^{-12}.$$

Hence, the result is $\log_2(x)$, or $\log_2(1329) - 12$, or −1.623873859.

Thus, in the fixed point arithmetic notation used in the example of 420, the result can be obtained by computing $\log_2$ of an integer number, as shown with the previous example and subtracting 12 from the result.

CONCLUSION

While exemplary embodiments of the present invention have been described with respect to digital logic blocks and memory tables within a digital signal processor, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit or micro-controller. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, wherein, when the program code is loaded into and executed by a machine, such as a processor, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

It is to be understood that the embodiments and variations shown and described herein are merely illustrative of the principles of this invention and that various modifications may be implemented by those skilled in the art without departing from the scope and spirit of the invention.

We claim:

1. A method performed by a vector-based digital signal processor for evaluating a non-linear logarithm function for an input vector, x, said method comprising:

obtaining one or more logarithm software instructions that implement said non-linear logarithm function;

in response to at least one of said obtained logarithm software instructions, invoking at least one hardware functional unit that implements said one or more logarithm software instructions to perform the following steps in hardware for each component of said input vector, x, to produce a corresponding component of an output vector, wherein said input vector, x, comprises a plurality of said components and wherein said vector-based digital signal processor processes said plurality of components substantially simultaneously:

decomposing each component of said input vector, x, to a first part, N, a second part, q, and a remaining part, r, wherein said first part, N, is identified by a position of a most significant bit of said input vector, x, and said second part, q, is comprised of a number of bits following said most significant bit, wherein said number is small relative to a number of bits in said input vector, x;

obtaining a value $$\text{Log}_2\left(1 + \frac{1}{2}q\right)$$

from a first look-up table in a random access memory (RAM) of said vector-based digital signal processor based on said second part, q;

computing an epsilon term, E, using the expression $$\frac{2^{-N}}{1 + \frac{1}{2}q} r;$$

evaluating an expression Log: (1+ε) using a polynomial approximation; and determining said logarithm function for said input vector, x, by summing said values of N, $$\text{Log}_Z\left(1 + \frac{1}{2}q\right)$$

and $\log_2(1+\epsilon)$ to produce said corresponding component of said output vector, wherein a predefined software instruction keyword for said non-linear logarithm function is part of an instruction set of said vector-based digital signal processor.

2. The method of claim 1, further comprising the step of translating an initial basis of said logarithm function from a binary representation to an arbitrary basis, Y, by multiplying a result of said determining step by $\log_Y(2)$, where $\log_Y(2)$, is obtained from a look-up table.

3. The method of claim 1, further comprising the step of obtaining a value $$\left(1 + \frac{1}{2}q\right)^{-1}$$

from a second look-up table.

4. The method of claim 1, wherein said step of computing said epsilon term, ε, further comprises the steps of shifting r by N and multiplying by $$\left(1+\frac{1}{2}q\right)^{-1}.$$

5. The method of claim 1, wherein said polynomial approximation is a cubic approximation.

6. The method of claim 1, wherein entries in said look-up table have a fewer number of bits than a number of bits in said input vector, x.

7. A vector-based digital signal processor for evaluating a non-linear logarithm function for an input vector, x, comprising:
- an input for receiving one or more logarithm software instructions that implement said non-linear logarithm function;
- a memory storing at least one look-up table; and
- at least one processor, coupled to the memory, operative to:
  - in response to at least one of said obtained logarithm software instructions, invoke at least one hardware functional unit that implements said one or more non-linear logarithm software instructions to perform the following steps in hardware for each component of said input vector, x, to produce a corresponding component of an output vector, wherein said input vector, x, comprises a plurality of said components and wherein said vector-based digital signal processor processes said plurality of components substantially simultaneously:
  - decompose each component of said input vector, x, to a first part, N, a second part, q, and a remaining part, r, wherein said first part, N, is identified by a position of a most significant bit of said input vector, x, and said second part, q, is comprised of a number of bits following said most significant bit, wherein said number is small relative to a number of bits in said input vector, x;
  - obtain a value $$\text{Log}_2\left(1+\frac{1}{2}q\right)$$

from a first look-up table in a random access memory (RAM) of said vector-based digital signal processor based on said second part, q;
- compute an epsilon term, C, using the expression $$\frac{2^{-N}}{1+\frac{1}{2}q}r;$$

- evaluate an expression $\text{Log}_2(1+\epsilon)$ using a polynomial approximation; and
- determine said logarithm function for said input vector, x, by summing said values of N, $$\text{Log}_2\left(1+\frac{1}{2}q\right)$$

and $\text{Log}_2(1+\epsilon)$ to produce said corresponding component of said output vector, wherein a predefined software instruction keyword for said non-linear logarithm function is part of an instruction set of said vector-based digital signal processor.

8. The digital signal processor of claim 7, wherein said processor is further configured to translate an initial basis of said input value, x, to an arbitrary basis, Y, by multiplying a result of said logarithm function by $\text{Log}_Y(2)$, where $\log_Y(2)$, is obtained from a look-up table.

9. The digital signal processor of claim 7, wherein said processor is further configured to obtain a value $$\left(1+\frac{1}{2}q\right)^{-1}$$

from a look-up table.

10. The digital signal processor of claim 7, wherein said epsilon term, $\epsilon$, is computed by shifting r by N and multiplying by $$\left(1+\frac{1}{2}q\right)^{-1}.$$

11. The digital signal processor of claim 7, wherein said polynomial approximation is a cubic approximation.

12. The digital signal processor of claim 7, wherein said digital signal processor executes software instructions from program code.

13. The digital signal processor of claim 7, wherein entries in said look-up table have a fewer number of bits than a number of bits in said input vector, x.

14. An integrated circuit, comprising:
- a digital signal processor for evaluating a non-linear logarithm function for an input value, x, comprising:
  - an input for receiving one or more logarithm software instructions that implement said non-linear logarithm function;
  - a memory storing at least one look-up table; and
  - at least one processor, coupled to the memory, operative to:
    - in response to at least one of said obtained logarithm software instructions, invoke at least one hardware functional unit that implements said one or more atomic logarithm software instructions to perform the following steps in hardware for each component of said input vector, x, to produce a corresponding component of an output vector, wherein said input vector, x, comprises a plurality of said components and wherein said vector-based digital signal processor processes said plurality of components substantially simultaneously:
    - decompose each component of said input vector, x, to a first part, N, a second part, q, and a remaining part, r, wherein said first part, N, is identified by a position of a most significant bit of said input vector, x, and said second part, q, is comprised of a number of bits following said most significant bit, wherein said number is small relative to a number of bits in said input vector, x;
    - obtain a value $$\text{Log}_2\left(1+\frac{1}{2}q\right)$$

from a first look-up table in a random access memory (RAM) of said vector-based digital signal processor based on said second part, q;

compute an epsilon term, $\Sigma$, using the expression $$\frac{2^{-N}}{1+\frac{1}{2}q}r;$$

evaluate an expression $\text{Log}_2(1+\epsilon)$ using a polynomial approximation; and determine said logarithm function for said input vector, x, by summing said values of N, $$\text{Log}_Z\left(1+\frac{1}{2}q\right)$$

and $\text{Log}_2(1+\Sigma)$ to produce said corresponding component of said output vector, wherein predefined software instruction keyword for said non-linear logarithm function is part of an instruction set of said vector-based digital signal processor.

15. The integrated circuit of claim 14, wherein said processor is further configured to translate an initial basis of said input value, x, to an arbitrary basis, Y, by multiplying a result of said logarithm function by $\text{Log}_Y(2)$, where $\log_Y(2)$, is obtained from a look-up table.

16. The integrated circuit of claim 14, wherein said processor is further configured to obtain a value $$\left(1+\frac{1}{2}q\right)^{-1}$$

from a look-up table.

17. The integrated circuit of claim 14, wherein said epsilon term, $\epsilon$, is computed by shifting r by N and multiplying by $$\left(1+\frac{1}{2}q\right)^{-1}.$$

18. The integrated circuit of claim 14, wherein entries in said look-up table have a fewer number of bits than a number of bits in said input vector, x.

19. A method performed by a vector-based digital signal processor for evaluating a logarithm function for an input vector, x, having an initial basis, Z, said method comprising:
obtaining one or more logarithm software instructions that implement said logarithm function;
in response to at least one of said obtained logarithm software instructions, invoking at least one hardware functional unit that implements said one or more logarithm software instructions to perform the following steps in hardware for each component of said input vector, x, to produce a corresponding component of an output vector, wherein said input vector, x, comprises a plurality of said components and wherein said vector-based digital signal processor processes said plurality of components substantially simultaneously:
decomposing each component of said input vector, x, to a first part, N, a second part, q, and a remaining part, r, wherein said first part, N, is identified by a position of a most significant bit of said input vector, x, and said second part, q, is comprised of a number of bits following said most significant bit, wherein said number is small relative to a number of bits in said input vector, x;
obtaining a value $$\text{Log}_Z\left(1+\frac{1}{Z}q\right)$$

from a first look-up table in a random access memory (RAM) of said vector-based digital signal processor based on said second part, q;
computing an epsilon term, E, using the expression $$\frac{Z^{-N}}{1+\frac{1}{Z}q}r;$$

evaluating an expression $\text{Log}_z(1+\epsilon)$ using a polynomial approximation; and
determining said logarithm function for said input vector, x, by summing said values of N, $$\text{Log}_Z\left(1+\frac{1}{Z}q\right)$$

and $\text{Log}_z(1+\epsilon)$ to produce said corresponding component of said output vector, wherein a predefined software instruction keyword for said non-linear logarithm function is part of an instruction set of said vector-based digital signal processor.

20. The method of claim 19, further comprising the step of translating an initial basis of said logarithm function from a binary representation to an arbitrary basis, Y, by multiplying a result of said determining step by $\text{Log}_Y(2)$, where $\log_Y(2)$, is obtained from a look-up table.

* * * * *